May 15, 1928. 1,669,805
J. P. BEER
LATCH MECHANISM FOR HOOKS
Filed Feb. 7, 1927
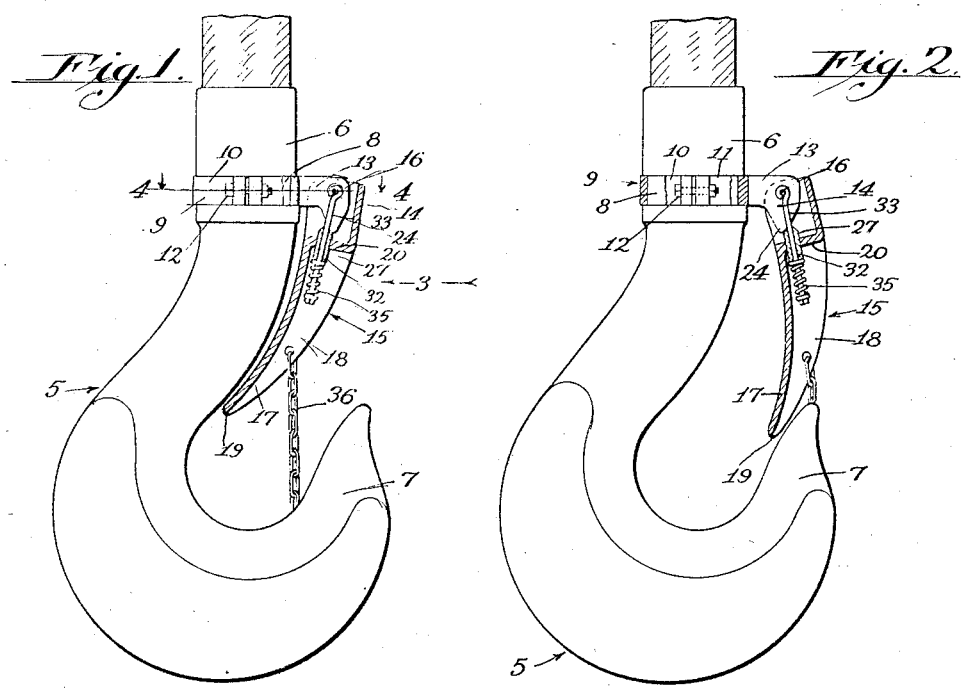
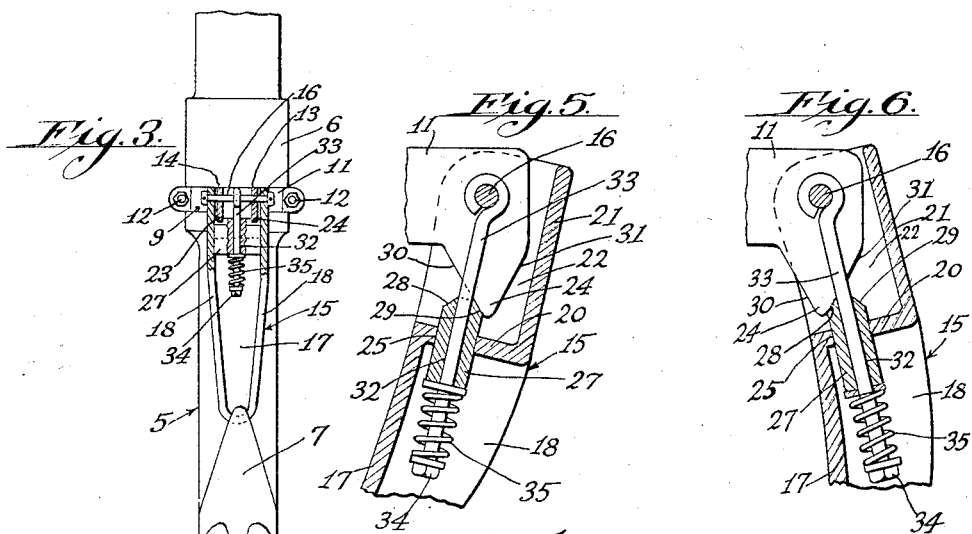
Inventor
JOSEPH PETER BEER
by Edmund A. Thaxter
Attorney Patented May 15, 1928.

1,669,805

UNITED STATES PATENT OFFICE.

JOSEPH PETER BEER, OF WILMINGTON, CALIFORNIA, ASSIGNOR TO REGAN FORGE AND ENGINEERING COMPANY, OF SAN PEDRO, CALIFORNIA, A CORPORATION OF CALIFORNIA.

LATCH MECHANISM FOR HOOKS.

Application filed February 7, 1927. Serial No. 166,367.

This invention relates more specifically to a latch bar for controlling the mouths of hooks.

An important object of the invention is to provide a simple and efficient latch bar for controlling the mouths of hooks that may be quickly moved by a simple pull of an operating chain or cable into an extended or retracted position and readily maintained in such positions against accidental misplacement.

A further object is to provide a latch bar for hooks that may be readily secured to hooks not supplied with safety appliances.

Further objects and advantages will be apparent from the following description, reference being had to the accompanying drawings that represent an embodiment of my invention, in which:

Fig. 1 is a side elevation of a hook showing the latch bar in a retracted or open position.

Fig. 2 is a similar view showing the latch bar in an extended closed position.

Fig. 3 is an elevation of the hook looking in the direction of the arrow 3 in Fig. 1, parts of the latch bar operating mechanism being shown in section.

Fig. 4 is a transverse section through the hook taken on line 4—4 of Fig. 1.

Fig. 5 is an enlarged detail sectional view of the latch bar and its operating mechanism showing the latch bar in a retracted position.

Fig. 6 is a similar view showing the latch bar in an extended position.

In the drawings, the hook shown is of a type usually employed in oil well drilling operations, but it will be understood that the latch bar mechanism may be employed with other forms of hooks with equally satisfactory results. The hook 5, consists of a shank 6 and a hooked shaped member 7, the shank having a reduced portion 8 for the attachment of the latch bar supporting collar 9. This collar is preferably formed in two segmental parts 10, 11, their abutting ends being adjustably secured together by bolts 12 in order that the collar and the latching mechanism connected thereto may be readily detached from the hook for repairs or replacement of parts. Projecting from the outer face of the part 11 of the collar and preferably formed integral therewith, are lugs 13, 14, spaced a suitable distance apart which carry the latch bar 15 and its operating mechanism. The upper end of this latch bar is pivotally secured to the lugs 13 and 14 by a hinge pin 16 in order that it may be swung into either an extended or closed position as clearly shown in Figs. 1 and 2 of the drawings. Bar 15 consists of a curved portion 17 having at either side longitudinally extending ribs 18 that taper from its upper end downwardly to its lower pointed end 19, a transverse bearing portion 20 being formed adjacent its upper end. Extending upwardly from the outer edge of this portion is a web 21 that forms a recess 22 into which the lugs 13, 14, extend.

The lower ends 23, 24 of the lugs 13, and 14 are of wedge-shaped form and the apexes of the lower ends are disposed in vertical alinement with the pivot pin 16. Mounted between the longitudinally extending ribs 18 of the latch bar 15 and movably disposed in a slot 25 in the bearing portion 20 is a plunger block 27, having bevelled upper transverse edges 28, 29, in order that said edges will form a perfect contact with the edges 30, 31, of the lower ends 23, 24, of the lugs when the bar is swung to either of its open or closed positions, see Figs. 5 and 6. Plunger block is provided midway of its side edges with a bore 32, through which passes a hook bolt 33, its hooked end pivotally engaging the hinge pin 16, and its lower end provided with a nut 34. A compression spring 35 is disposed on the bolt 31 between the plunger block and nut, in order to force the upper bevelled ends of the block into positive engagement with the edges of the wedge-shaped lugs of the collar and to maintain the bar against movement when in its extended or retracted position.

From the above description the operation of the latch mechanism will be obvious, normally the latch bar 15 is disposed across the mouth of the hook 5. A pull on the chain or cable 36 will move the bar rearwardly, the wedge-shaped portions 23 and 24 of the lugs 13 and 14 forcing the plunger block 27 downwardly against the action of the compression spring 33. As soon as the plunger passes the apexes of the wedge-shaped ends of the lugs 13 and 14 the spring will force the plunger block upwardly with its bevelled edge 29 into contact with the edges 30 of the lugs 13 and 14, thus maintaining the latch bar in its retracted position as shown in Figs. 1 and 5.

What I claim is:

1. In a hook, a pivoted safety latch bar for closing the mouth of the hook, and resiliently actuated pivoted means for maintaining the latch bar against accidental movement in either of its extended or retracted positions.

2. In a hook, a pivoted safety latch bar for closing the mouth of said hook, a spring operated plunger pivotally mounted on said latch bar, cam means cooperating with said plunger to maintain the bar against accidental movement in either of its open or closed positions and means for manually operating the latch bar against accidental movement.

3. In a hook, a pivoted safety latch bar for closing the mouth of said hook, a spring controlled plunger mounted on said bar, cam means cooperating with the plunger for operating the plunger to maintain the bar against accidental movement when swung to either its open or closed positions, and manual means for operating the latch bar.

4. In a hook, a hook member, a pivoted safety latch bar for closing the mouth of said hook, a spring operated plunger mechanism pivotally mounted on the latch pivot bar, a pair of wedge-shaped lugs secured to the hook and engaging the plunger to maintain the bar against accidental movement when swung to a retracted or extended position and means to move said latch bar.

5. A suspension hook comprising a hook, a latch bar pivotally connected with the shank of the hook and bearing against the inner face of the point of the hook, a cam member attached to the shank of the hook for controlling the movement of the latch bar, an arm pivotally mounted on the latch bar pivot, said arm passing through an opening in the latch bar, a plunger movably mounted on said pivoted arm, its upper end bearing against the cam member, a coiled spring mounted on said arm and bearing against said plunger to force the same into engagement with the cam member, said cam member adapted to maintain the latch bar against movement in either of its open or closed positions, and means to operate the latch bar.

In witness that I claim the foregoing I have hereunto subscribed my name this 11th day of December, 1926.

JOSEPH PETER BEER.